United States Patent
Schmidt

(10) Patent No.: US 7,344,670 B2
(45) Date of Patent: Mar. 18, 2008

(54) LOST CORE PLASTIC MOLDING PROCESS FOR TRANSFERRING, POSITIONING AND MOLDING INSERTS INTO A PLASTIC PART

(75) Inventor: Horst Schmidt, Tilbury (CA)

(73) Assignee: Build A Mold Limited, Windsor, Ontario (CA)

( * ) Notice: Subject to any disclaimer, the term of this patent is extended or adjusted under 35 U.S.C. 154(b) by 817 days.

(21) Appl. No.: 10/402,476

(22) Filed: Mar. 28, 2003

(65) Prior Publication Data

US 2003/0183983 A1    Oct. 2, 2003

Related U.S. Application Data

(60) Provisional application No. 60/368,244, filed on Mar. 28, 2002.

(51) Int. Cl.
  *B29C 33/76* (2006.01)
  *B29C 45/26* (2006.01)
(52) U.S. Cl. ............... 264/317; 264/221; 264/225; 264/271.1; 264/313
(58) Field of Classification Search ............ 264/221, 264/279, 317; 440/900
  See application file for complete search history.

(56) References Cited

U.S. PATENT DOCUMENTS 4,743,481 A * 5/1988 Quinlan et al. ............ 428/35.7
5,614,143 A * 3/1997 Hager ..................... 264/221
6,547,210 B1 * 4/2003 Marx et al. ................ 249/175
2002/0195741 A1 * 12/2002 Jessberger et al. .......... 264/221

FOREIGN PATENT DOCUMENTS

| EP | 1065353 A1 * | 1/2001 |
| JP | 02001062845 A * | 3/2001 |
| WO | WO0138059 A1 * | 5/2001 |

* cited by examiner

*Primary Examiner*—Monica A Huson
(74) *Attorney, Agent, or Firm*—Carlson, Gaskey & Olds

(57) ABSTRACT

A method of producing a molded article includes the steps of positioning an insert within a first mold, and filling the first mold with a low melt allow to form a lost core assembly. The lost core assembly includes an external shape corresponding to the desired cavity formed within the molded article. The inserts are supported within the lost core and form a part of the surface of the cavity of the completed molded article. The lost core assembly is over-molded with a thermoplastic or thermoset material. The alloy material is removed leaving the inserts within the molded article to form specific portions of the cavity.

19 Claims, 4 Drawing Sheets

LOST CORE PLASTIC MOLDING PROCESS FOR TRANSFERRING, POSITIONING AND MOLDING INSERTS INTO A PLASTIC PART

This invention claims priority to U.S. Provisional application Ser. No. 60/368,244 filed Mar. 28, 2002.

BACKGROUND OF THE INVENTION

The subject invention is method of producing a plastic article utilizing a lost core process, and specifically a method of producing a plastic article by supporting inserts within a lost core assembly for positioning within the completed plastic article.

Conventional lost core-molding processes include the formation of a core defining a desired inner cavity configuration of the completed part. The core is formed from an alloy having a low melting temperature. The formed core is placed into a plastic injection mold and molded over by a thermoplastic or thermoset material to form the desired shape of the plastic article. The molded plastic article containing the core is submerged in a hot liquid bath to melt and drain the core material from the plastic article.

Many types of devices require specifically configured cavities to support rotating members. Further, the rotating members required supporting features composed of material capable of withstanding specific wear conditions. One example of such a device is an outboard assembly for a motorboat. The outboard assembly transfers power from an interior mounted engine to a propeller positioned within the water. Conventional outboard assemblies are fabricated from an outer housing cast in aluminum. The cast aluminum housing is finish machined to form the required inner mounting structures that support the drive components that drive the propeller. In addition, openings for mounting fasteners and the like are machined into the aluminum casting. The majority of costs associated with the production of an outboard are consumed by the cost of the finish machining operations.

There are several inherent problems associated with the use of aluminum as a material to fabricate an outboard. Although aluminum does not rust as a ferrous metal does in the presence of water, there is a certain amount of material loss associated with the constant immersion in water. Further, cast aluminum is often plagued by porosity that degrades the strength of the casting. Pure aluminum is typically to soft to be used without mixing other strengthening elements, at the sacrifice of corrosion resistance. Typically, bearing races and other surfaces supporting rotating drive components must be fabricated from sufficiently hard materials, thereby requiring inserts to be installed within the aluminum housing.

Accordingly, it is desirable to develop a method of producing a plastic article capable of accommodating rotating members and that substantially reduces finish machining and with economical materials. Further, it is desirable to develop an outboard assembly with economically beneficial materials and processes that is better suited for the water environment.

SUMMARY OF THE INVENTION

The present invention is a method of producing a molded article utilizing a lost core assembly supporting a plurality of inserts for positioning within the completed plastic article.

The method includes the steps of positioning at least one insert within a first mold and filling the first mold with a first material to form a lost core assembly. The inserts are held within the lost core assembly in a predetermined position. The lost core assembly is then placed into a second mold and over-molded with a second material to form the plastic article. Once the second material has sufficiently hardened, the plastic article, including the lost core assembly is removed from the second mold. The material comprising the lost core assembly is then removed leaving the inserts within the cavity formed by the lost core assembly.

Accordingly, the present invention provides a method of producing a plastic article containing inserts supporting rotating members or other internal components while substantially reducing costs.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
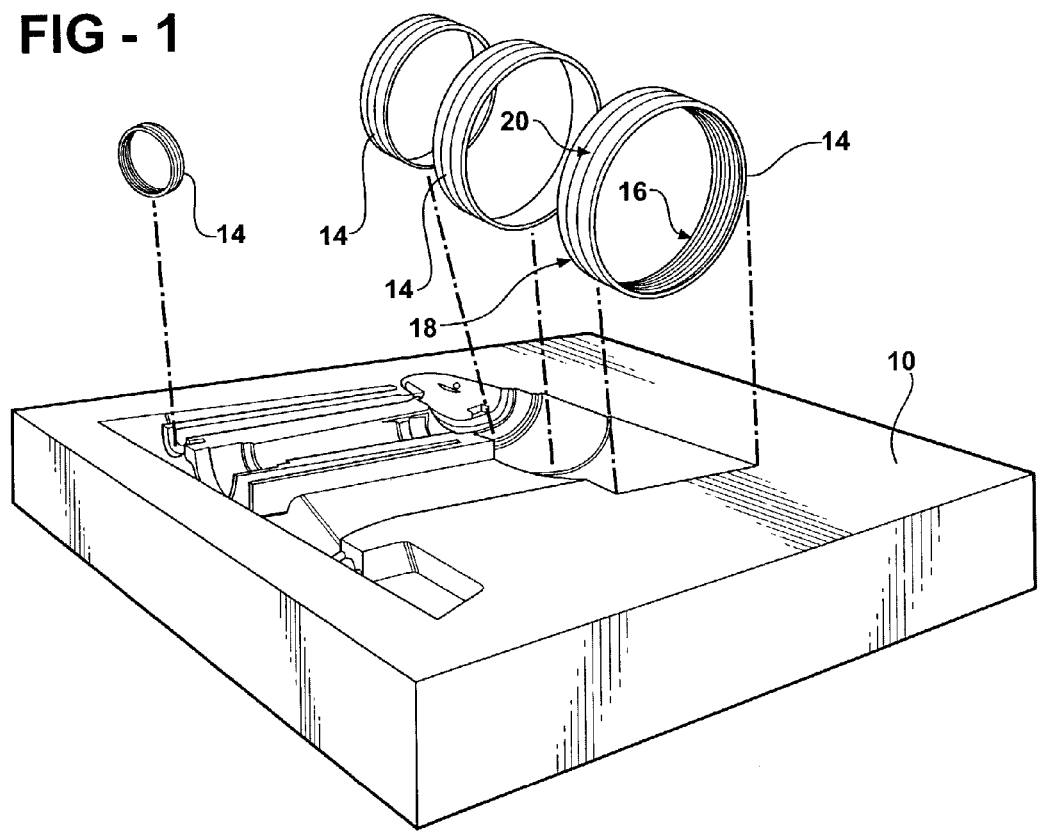
FIG. 1 is a perspective view of a plurality of inserts and a first mold.
Figure 2:
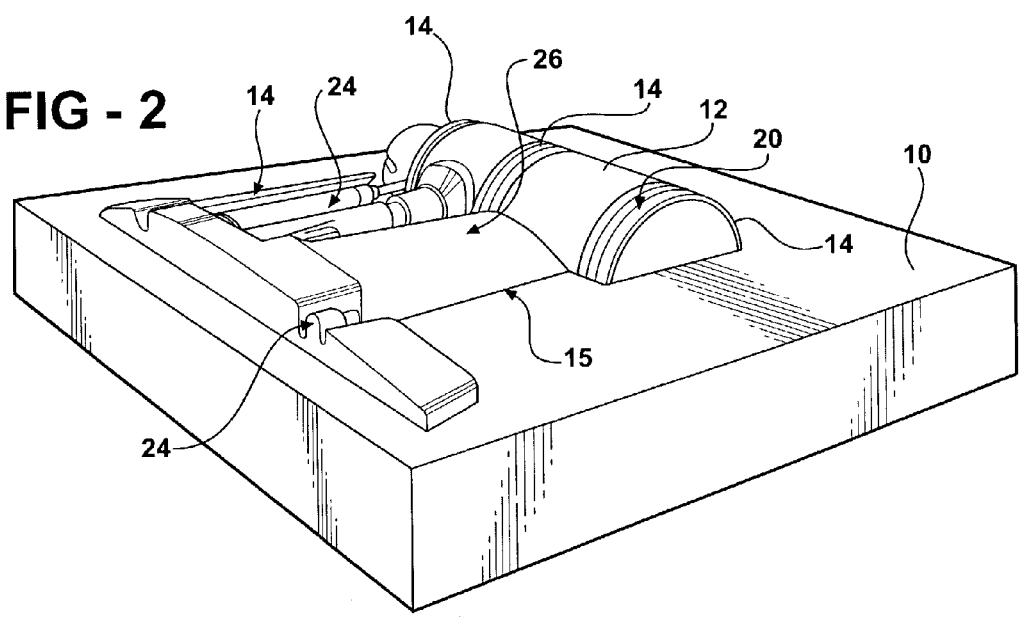
FIG. 2 is a perspective view of a completed lost core assembly within the first mold.
Figure 3:
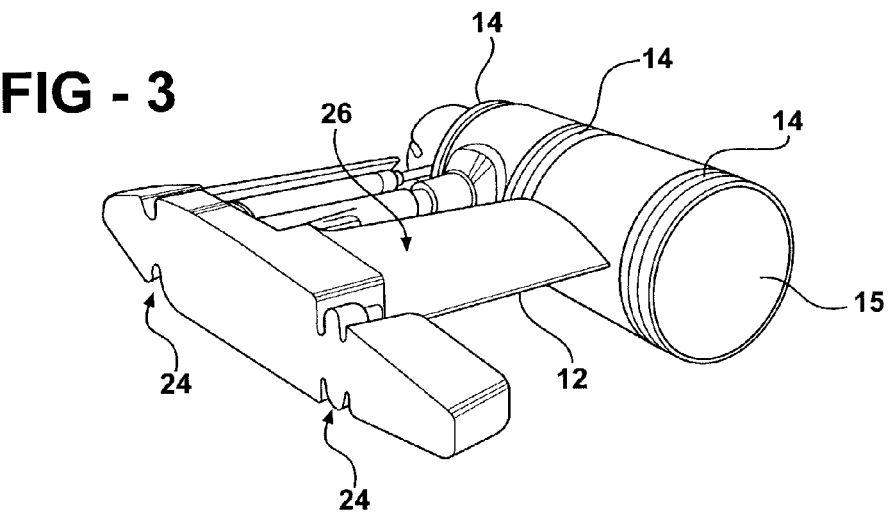
FIG. 3 is a perspective view of a completed lost core assembly.
Figure 7:
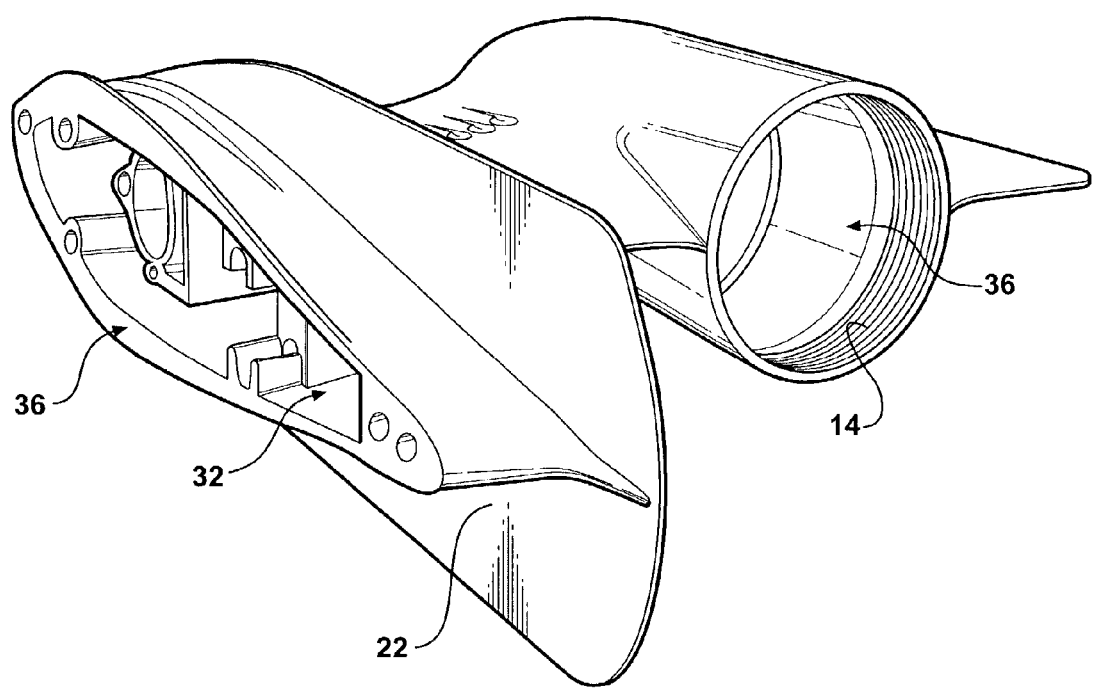
FIG. 7 is a perspective view of the completed plastic article.

Referring to FIGS. 1-3, the present invention is a method of fabricating a plastic article. The method of the present invention is illustrated by the process of fabricating an outboard housing assembly 22 (FIG. 7). The outboard housing assembly 22 is only one example of a plastic article that may be fabricated with the benefit of this disclosure.

The method includes a first mold 10 for forming a lost core assembly 12. The lost core assembly 12 comprises a low melt alloy 15 including a mixture of components known to provide a specific predetermined melting point. The lost core alloy 15 comprises a combination of several elements mixed according to predetermined proportions to obtain a desired melting point. Examples of alloy components include lead, tin, bismuth, antimony, cadmium, copper, and the like. A worker knowledgeable in the art with the benefit of this disclosure would understand which combination of alloy elements are required to obtain a desired melting temperature.

A plurality of inserts 14 are placed into the first mold 10. The first mold 10 is filled with alloy material 15 such that each insert 14 is positioned as required in the completed plastic article 22. Each insert 14 includes inner and outer surfaces 16, 18. The outer surface 18 includes attachment features 20 cooperating with a second material forming the plastic article to maintain each of the inserts 14 in the desired final position within the completed plastic article 22. The internal surface 16 of the insert is held secure within the lost core assembly 12. Each of the inserts 14 are positioned within the first mold 10 relative to other inserts 14. The outer surface 18 of each insert 14 becomes encased in plastic and the inner surface 16 is exposed once the lost core material 15 is removed.

The lost core assembly 12 is molded to secure the position of each of the inserts 14 relative to each other and to include internal features 24 of the housing assembly 22. The internal features 24 comprise support structures for rotating drive members (not shown) along with openings for fasteners and cavities through which the drive members extend. As appreciated, an outer surface 26 of the lost core insert 12 defines an inner surface of a completed housing assembly 22 for the housing assembly 22.

Figure 4:
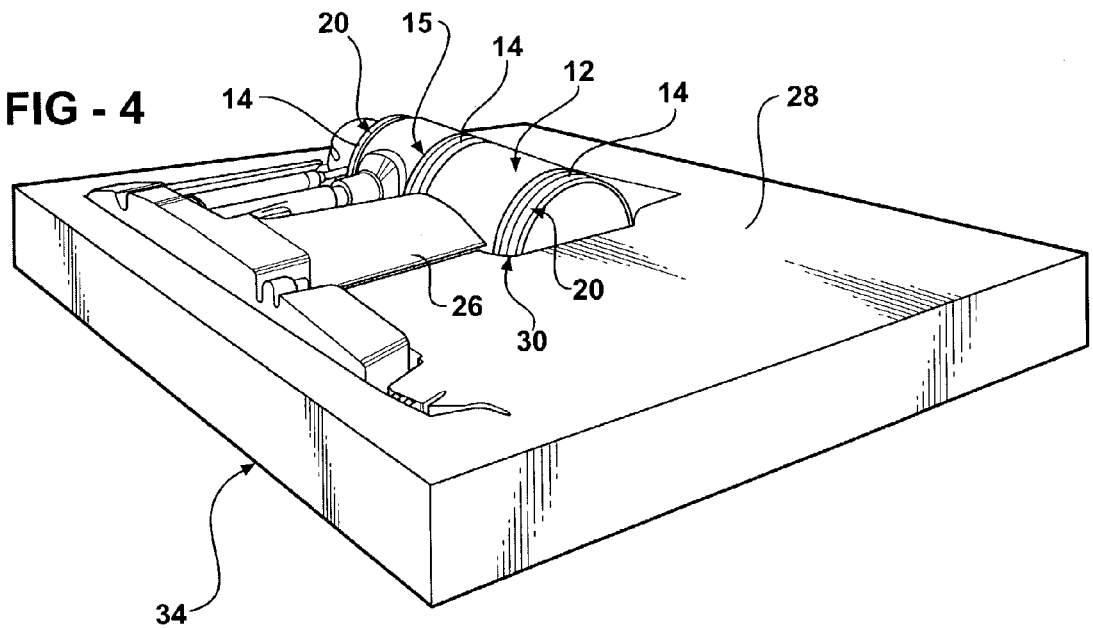
FIG. 4 is a perspective view of the lost core assembly within a second mold.

Referring to FIG. 4, the lost core insert 12 is placed within a plastic injection mold 28 that defines a cavity 30. The cavity 30 defines the outer surface configuration of the complete housing assembly 22. Plastic injected into the cavity 30 is of a melting temperature compatible with the melting temperature of the low melt alloy 15 used to form the lost core assembly 12. Therefore, hot liquid plastic entering the mold 28 does not does not melt or damage the lost core assembly 12. Molten plastic material, shown schematically at 34, entering the cavity 30 envelops the lost core insert 12 along with the inserts 14. The plastic material 34 comprises known thermoplastic and thermoset materials.

The inserts 14 are secured within the housing assembly 22 and within the plastic material 34. Securing of the inserts 14 is accomplished by attachment features 20 disposed on the outer surface 18 of each insert 14. Preferably, the attachment feature 20 disposed on the outer surface 18 of each insert 14 is a knurled surface that cooperates with the plastic material 34 to secure the insert 14 in place. Alternatively, the attachment features 20 may be a groove including an undercut such that plastic material fills the groove and undercut to secure the insert 14 to the plastic material. A worker skilled in the art with the benefit of this disclosure would understand how to configure an attachment feature 20 to secure each insert within the housing assembly 22.

Figure 5:
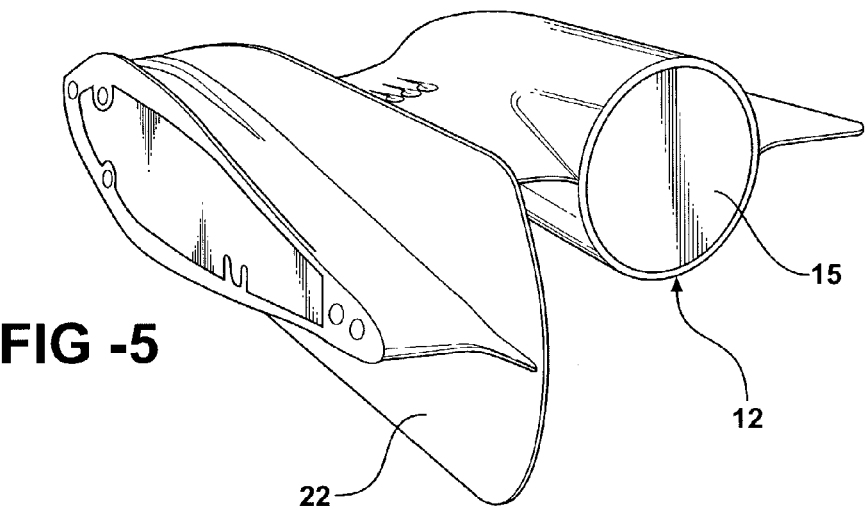
FIG. 5 is a perspective view of a plastic article including the lost core assembly.
Figure 6:
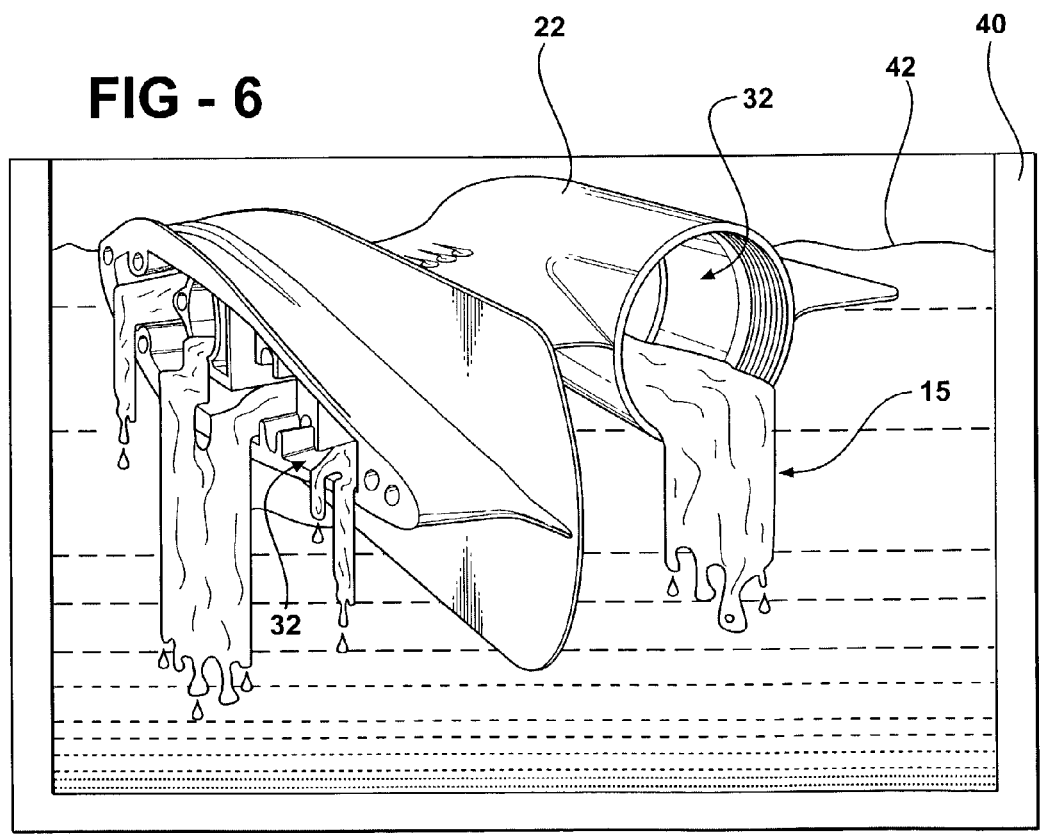
FIG. 6 is a perspective view during removal of a portion of the lost core assembly from the plastic article.

Referring to FIGS. 5-7, once the plastic material 34 has hardened, the housing assembly 22 containing the lost core assembly 12 is removed from the plastic injection mold 28. The housing assembly 22 including the lost core assembly 12 is submerged within a tank 40 containing liquid 42 at a temperature to melt the low melting alloy 15 without melting the plastic material 34. The low melting alloy 15 melts and drains from the plastic housing 22 to expose an inner surface 32 of a cavity 36 formed within the outboard assembly 22. The inner surface 32 of the cavity 36 is formed by the outer surface 38 of the lost core assembly 12. The inserts 14 are attached to the inner surface 32 within the outboard assembly 22 by the attachment features 20. The inserts 14 become an integral part of the inner surface 32 of the cavity 36. Although a hot liquid bath is discussed, it is within the contemplation of this invention to use any type of operation of method of removing the lost core material form the housing assembly 22.

The remaining plastic housing 22 includes an inner surface 32 as defined by the removed lost core assembly 12. The inner surface 32 includes the inserts 14 along with the cavity 36 to support and surround drive members. Preferably, the inserts 14 require no additional machining and are spaced relative to each other within specific predefined tolerances such that the drive members may be assembled to the housing assembly 22 as molded. Alternatively, the inserts 14 may require minimal machining to provide threads or other features such as holes that are not compatible with the lost core process. A worker knowledgeable in the art would understand how to machine such features into the inserts 14 of the molded plastic housing 22.

The completed plastic outboard housing 22 may be finished as desired by way of an outer cosmetic coating such as paint or an enamel coating. It is within the contemplation of this invention that the plastic outboard housing can be finished by way of any means known in the art. Alternatively, the plastic outboard housing 22 may be molded utilizing a plastic of the desired finished color such that further cosmetic finishing is not required.

The completed housing 22 substantially reduces or eliminates the amount of finish machining required to produce an outboard. Further, the plastic material is lighter than a comparable aluminum housing while being of comparable strength. In addition, the plastic material does not exhibit porosity, nor is the plastic material susceptible to corrosion problems encountered with an aluminum housing. The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention.

What is claimed is:

1. A method of producing a molded article comprising the steps of:
   a. positioning an insert within a first mold;
   b. filling the first mold with a first material to form a lost core assembly, wherein the insert is molded in to the lost core assembly;
   c. inserting the lost core assembly into a second mold;
   d. filling the second mold with a second material to form a plastic article containing the lost core assembly and completely covering an outer surface of the insert with the second material; and
   e. removing the first material to form a cavity including the insert, wherein the insert defines a portion of a surface of the cavity.

2. The method of claim 1, wherein said step e) further comprises submerging the plastic article with the lost core assembly into a liquid having a temperature greater than the melting temperature of the first material, and less than the melting temperature of the second material.

3. The method of claim 1, wherein said step d) further comprises defining a surface of the cavity with an outer surface of the lost core assembly.

4. The method of claim 1, wherein said step b) further comprises securing the insert with said first material within the lost core assembly.

5. The method of claim 1, wherein said step c) further comprises transferring the insert from said first mold to said second mold as part of the lost core assembly.

6. The method of claim 1, wherein said step a) further comprises positioning at least two inserts within the first mold in a desired position.

7. The method of claim 6, further comprising the step of maintaining the desired position of each insert during said steps b, c and d within said lost core assembly.

8. The method of claim 7, further comprising retaining the desired position of the inserts during said step c) within said plastic article.

9. The method of claim 1, wherein the insert defines a portion of a surface of the cavity.

10. The method of claim 1, including a plurality of inserts defining specific features of the cavity of the plastic article.

11. The method of claim 1, wherein said first material is a metal alloy.

12. The method of claim 1, wherein said first material is of a lower melting temperature than said second material.

13. The method of claim 1, wherein said second material comprises plastic.

14. The method of claim 1, wherein said insert comprises a bearing race for supporting a rotating component.

15. The method of claim 1, wherein said plastic article comprises an outboard assembly.

16. A method of fabricating an outboard assembly, said method comprising the steps of:
   a) positioning a plurality of inserts within a first mold;
   b) filling said first mold with a first material to form a lost core assembly, wherein the insert is molded into the lost core assembly;
   c) transferring said lost core assembly from said first mold to a second mold;
   d) filling said second mold with a second material to form the outboard assembly containing the lost core assembly, wherein an outer surface of the plurality of inserts is completely covered by the second material;
   e) removing said first material from said outboard assembly and retaining the plurality of inserts within the outboard assembly.

17. The method of claim 16, wherein said step c) further comprises submerging the plastic article with the lost core assembly into a liquid having a temperature greater than the melting temperature of the first material, and less than the melting temperature of the second material.

18. The method of claim 16, wherein the inserts are support structures for rotating members within the completed outboard assembly.

19. The method of claim 16, wherein the inserts include securing features cooperating with the outboard assembly to retain the inserts in a desired position.

* * * * *

UNITED STATES PATENT AND TRADEMARK OFFICE
CERTIFICATE OF CORRECTION

PATENT NO. : 7,344,670 B2 Page 1 of 1
APPLICATION NO. : 10/402476
DATED : March 18, 2008
INVENTOR(S) : Schmidt It is certified that error appears in the above-identified patent and that said Letters Patent is hereby corrected as shown below:

Claim 1, Column 4, line 33: "in to" should read as --into--

Claim 8, Column 4, line 64 "c)" should read as --e)--

Claim 17, Column 6, line 8: "c)" should read as --c)--

Signed and Sealed this

Seventeenth Day of June, 2008

JON W. DUDAS
*Director of the United States Patent and Trademark Office*